United States Patent
Daoud

[19]

[11] Patent Number: 5,907,127
[45] Date of Patent: May 25, 1999

[54] ENCLOSURE FOR TELECOMMUNICATIONS APPLICATIONS HAVING A CONFIGURABLE MOUNTING PLANE

[75] Inventor: Bassel H. Daoud, Parsippany, N.J.

[73] Assignee: Lucent Technologies Inc., Murray Hill, N.J.

[21] Appl. No.: 08/920,699

[22] Filed: Aug. 29, 1997

[51] Int. Cl.⁶ .................................................. H02G 3/14
[52] U.S. Cl. .......................................................... 174/57
[58] Field of Search ........................ 174/57, 50; 220/3.7, 220/3.92, 3.94; 361/645

[56] References Cited

U.S. PATENT DOCUMENTS

| | | | |
|---|---|---|---|
| 701,137 | 5/1902 | Bossert | 174/57 X |
| 920,401 | 5/1909 | Scism | 174/57 X |
| 1,878,335 | 9/1932 | Shull | 361/645 |
| 2,036,044 | 3/1936 | Hammer | 361/645 |
| 2,132,630 | 10/1938 | Jackson | 361/645 |
| 2,138,408 | 11/1938 | Rowe | 361/645 |
| 3,814,834 | 6/1974 | Glader | 174/57 |
| 5,571,993 | 11/1996 | Jones et al. | 174/57 |
| 5,683,005 | 11/1997 | Mordick | 220/3.7 |

*Primary Examiner*—Dean A. Reichard

[57] ABSTRACT

An enclosure, such as a building entrance protector (BEP) enclosure, has a base, a mid layer pivotally connected to the base, and a cover pivotally connected to the mid layer. A mounting plane mounted to the mid layer divides the enclosure into two chambers—an inner chamber and an outer chamber. The mid layer provides at least two different mounting positions for the mounting plane, in order to provide different sets of volumes for the two chambers. In particular, by moving the mounting plane from the lower mounting position to the upper mounting position, the volume of the inner chamber is increased, while the volume of the outer chamber is decreased. The enclosure is designed such that the mounting plane can be reconfigured from one mounting position to the other in the field and without disturbing any of the hardware, including any electrical connections, housed within the two chambers, including any hardware mounted directly to the mounting plane. As such, the volumes of the chambers in the enclosure can be efficiently changed in the field as needed to accommodate changing hardware needs.

3 Claims, 12 Drawing Sheets

ENCLOSURE FOR TELECOMMUNICATIONS APPLICATIONS HAVING A CONFIGURABLE MOUNTING PLANE

BACKGROUND OF THE INVENTION

1. Field of the Invention

The present invention relates to enclosures for telecommunications applications, and, in particular, to enclosures for receiving hardware for splicing and/or connecting to cables carrying telecommunications signals, such as telephone cables carrying telephone signals.

2. Description of the Related Art

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure would typically be mounted in the basement or first floor of the office building. A BEP enclosure may also be used to house the interface hardware for systems based on fiber optical communications. Similarly, BEP enclosures may be used with telecommunications systems carrying signals other than just telephone voice signals.

A BEP enclosure provides two main functions: (1) it houses the hardware that provides connections between a cable and the individual nodes (e.g., telephones) of a local network; and (2) it houses the hardware that provides electrical isolation between the cable and the local network. Electrical isolation is intended to prevent any high voltages and/or high currents that may exist from time to time in the cable from reaching the local network. For example, a BEP enclosure will house isolation components designed to protect telephone users from lightning striking a telephone cable. Such electrical isolation is typically provided by 5-pin plug-in protectors that quickly connect signals to ground upon detection of sufficiently high voltages or currents.

Depending on the situation, it may be desirable to control the access that different users have to the different types of hardware housed in a BEP enclosure. For example, when a BEP enclosure is to be used in an office building, it may be desirable to provide operators of the office building with access to the connection hardware housed in the BEP enclosure, but not to the isolation hardware. In this way, the office-building operators would be able to adjust the distribution of telephone signals from the cable to the various offices in the building, while, at the same time, being prevented from disturbing the electrical isolation hardware housed in the BEP enclosure.

To achieve this access control, BEP enclosures typically have two or more chambers that house the different types of hardware. For example, isolation components may be housed in a first chamber, and connection components, in a second chamber. The BEP enclosure can then be configured to provide only limited access to the office-building operators, that is, access to the second chamber but not to the first chamber. Representatives of the telephone service company, on the other hand, would have access to both chambers.

Figure 1A:
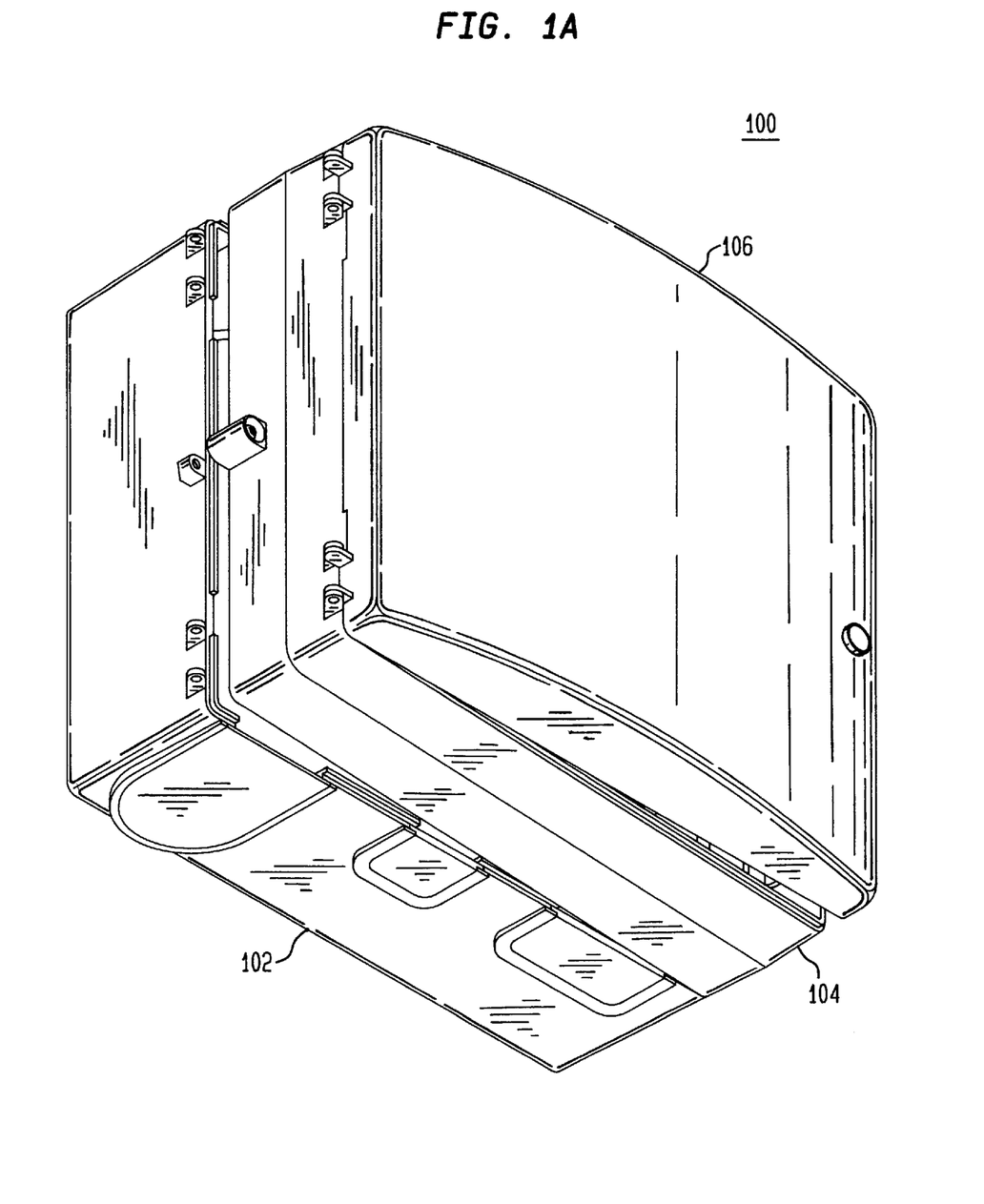
FIGS. 1(a)–(b) show perspective and cross-sectional views of a conventional BEP enclosure.
Figure 1B:
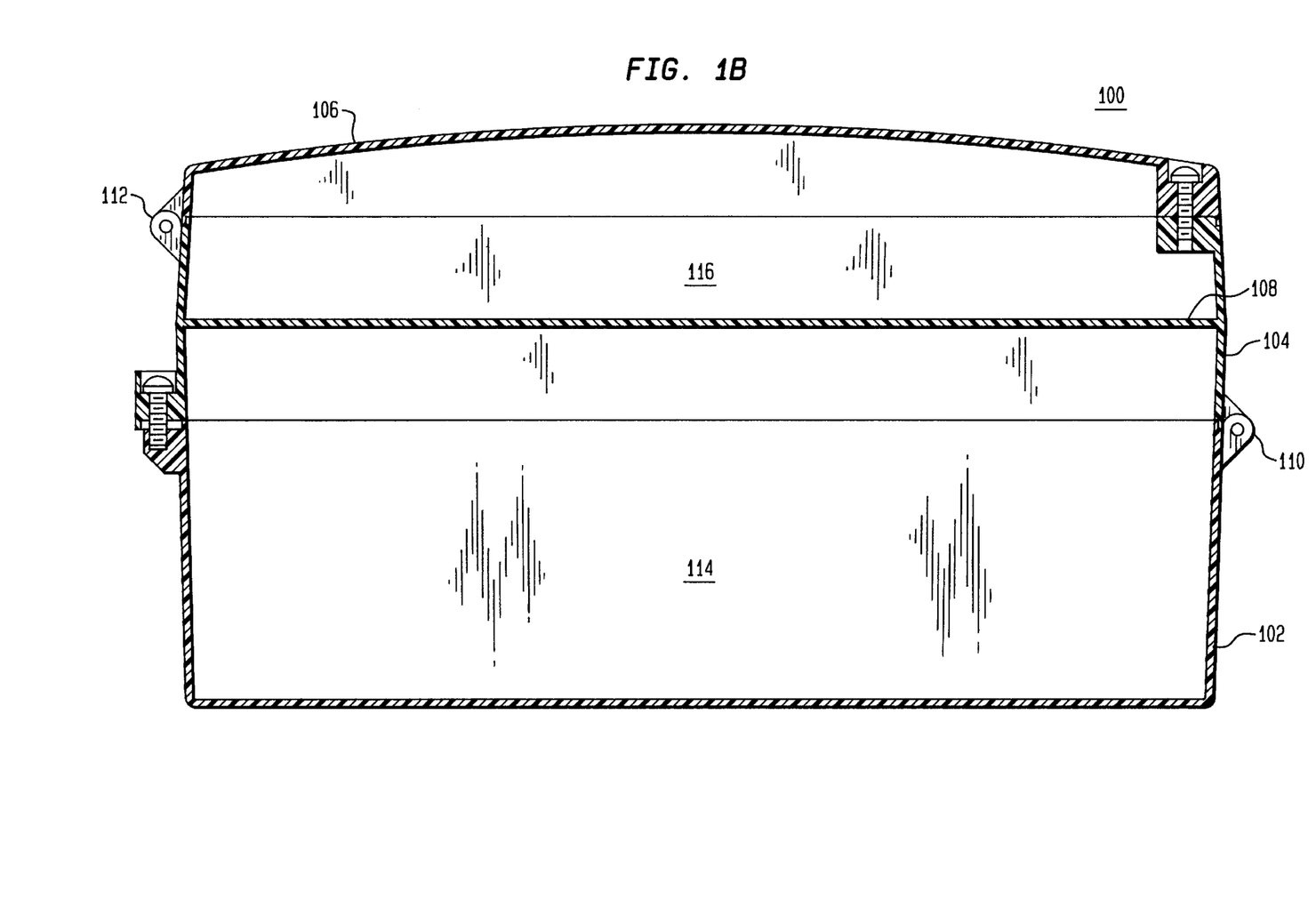

FIGS. 1(a) and 1(b) show perspective and cross-sectional views, respectively, of the three basic parts of a conventional BEP enclosure 100: the base 102, the mid layer 104, and the cover 106. The base is essentially a rectilinear box with a bottom, four side walls, and open on its top. The mid layer has four side walls with a mounting plane 108 perpendicular to the four side walls. The mid layer is adapted to be pivotally connected to the base at one side (110), and the cover is adapted to be pivotally connected to the mid layer at the other side (112). The interior of the base and the lower portion of the mid layer form an inner chamber 114 of the BEP enclosure, while the upper portion of the mid layer and the cover form an outer chamber 116 of the BEP enclosure. As such, the mounting plane of the mid layer forms both the top surface of the inner chamber and the bottom surface of the outer chamber.

Chamber access is typically controlled by the type of mechanism used to hold together the parts that form the chamber. For example, special security screws can be used to seal a chamber, thereby restricting access to only those individuals who have special tools designed to remove those security screws. Two such screws are 216-type screws and KS-type screws, each of which requires a different special tool to remove. If a regular slotted or Philips-head screw is used to secure the chamber, then access will not be restricted because regular and Philips-head screw drivers are readily available.

In certain circumstances, the hardware to be housed in the chambers of a BEP enclosure may change over time. For example, it may be desirable to replace one type of plug-in protector, used to provide high voltage/current electrical isolation and mounted to the bottom of the mounting plane within the inner chamber, with a faster, more reliable type of plug-in protector. Unfortunately, there may not be enough room in the inner chamber to add the improved protectors, which may be longer than the protectors that are to be replaced.

SUMMARY OF THE INVENTION

The present invention is directed to enclosures for telecommunications applications having two or more chambers, such as BEP enclosures, in which at least one mounting plane is configurable, such that it can be mounted in any of two or more mounting positions to change the volumes of the two chambers that are defined and separated by that mounting plane. Moreover, the mounting plane can be moved from one mounting position to another without disturbing any of the hardware, including any electrical connections, housed in the chambers, including any hardware mounted directly to the mounting plane. As such, the enclosure can be reconfigured in the field in an efficient manner, without having to interrupt any of the telecommunications services provided by the hardware housed within the enclosure.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2A:
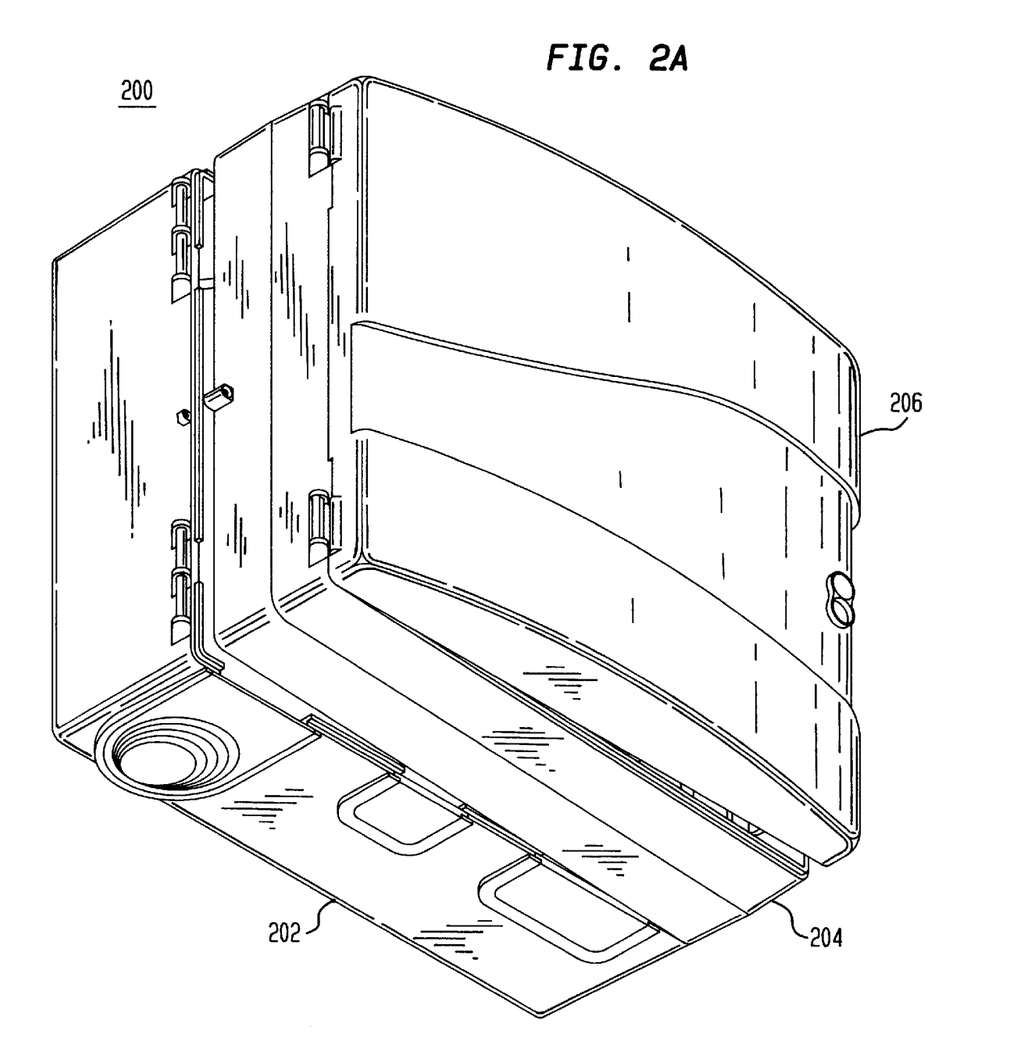
FIGS. 2A–C show perspective views of a BEP enclosure, according to one embodiment of the present invention.
Figure 2B:
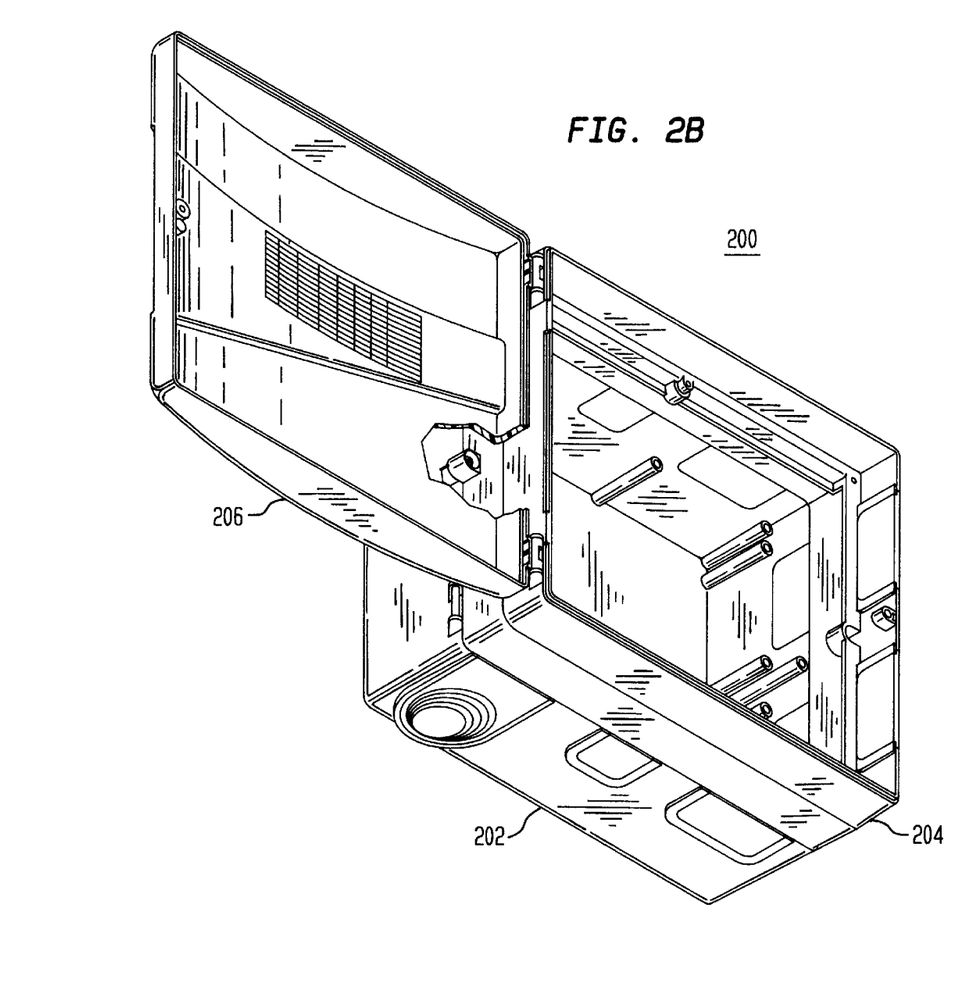
Figure 2C:
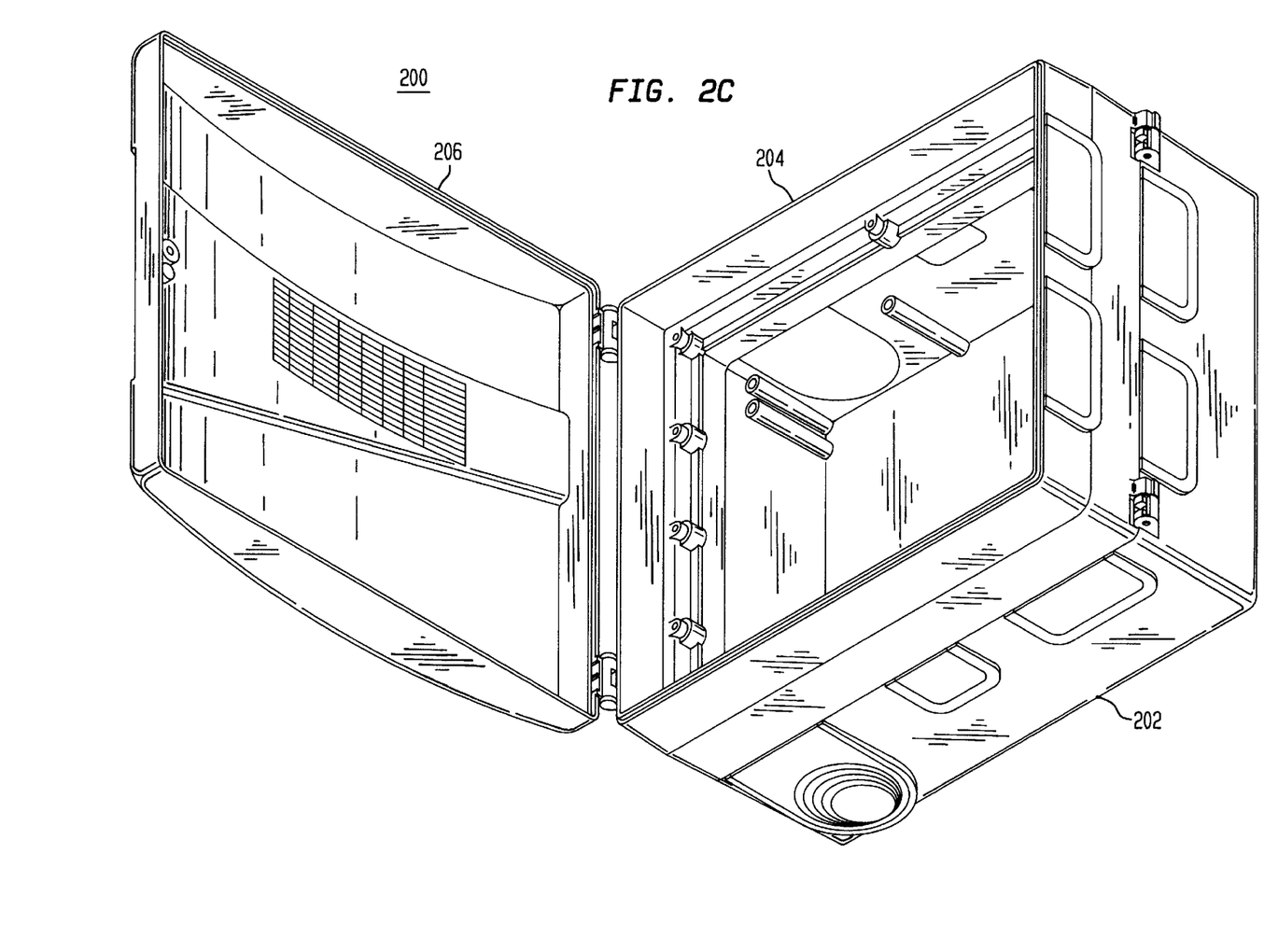

FIGS. 2A–C show perspective views of BEP enclosure 200, according to one embodiment of the present invention. BEP enclosure 200 has base 202, mid layer 204 pivotally connected to base 202, and cover 206 pivotally connected to mid layer 204. In this embodiment, cover 206 can be removed from mid layer 204, and mid layer 204 can be removed from base 202. In alternative embodiments of the present invention, cover 206 is permanently connected to mid layer 204 or mid layer 204 is permanently connected to base 202 or both.

Figure 3A:
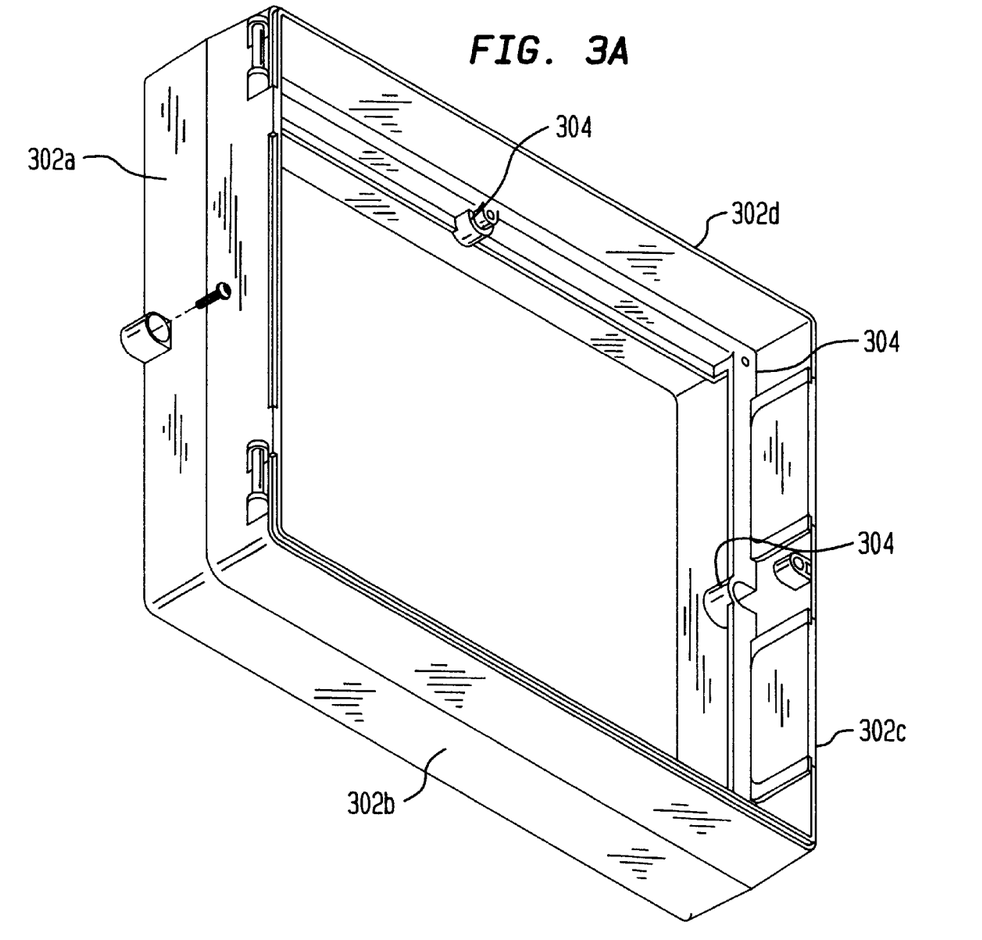
FIGS. 3A–B show perspective views of the mid layer of FIG. 2.
Figure 3B:
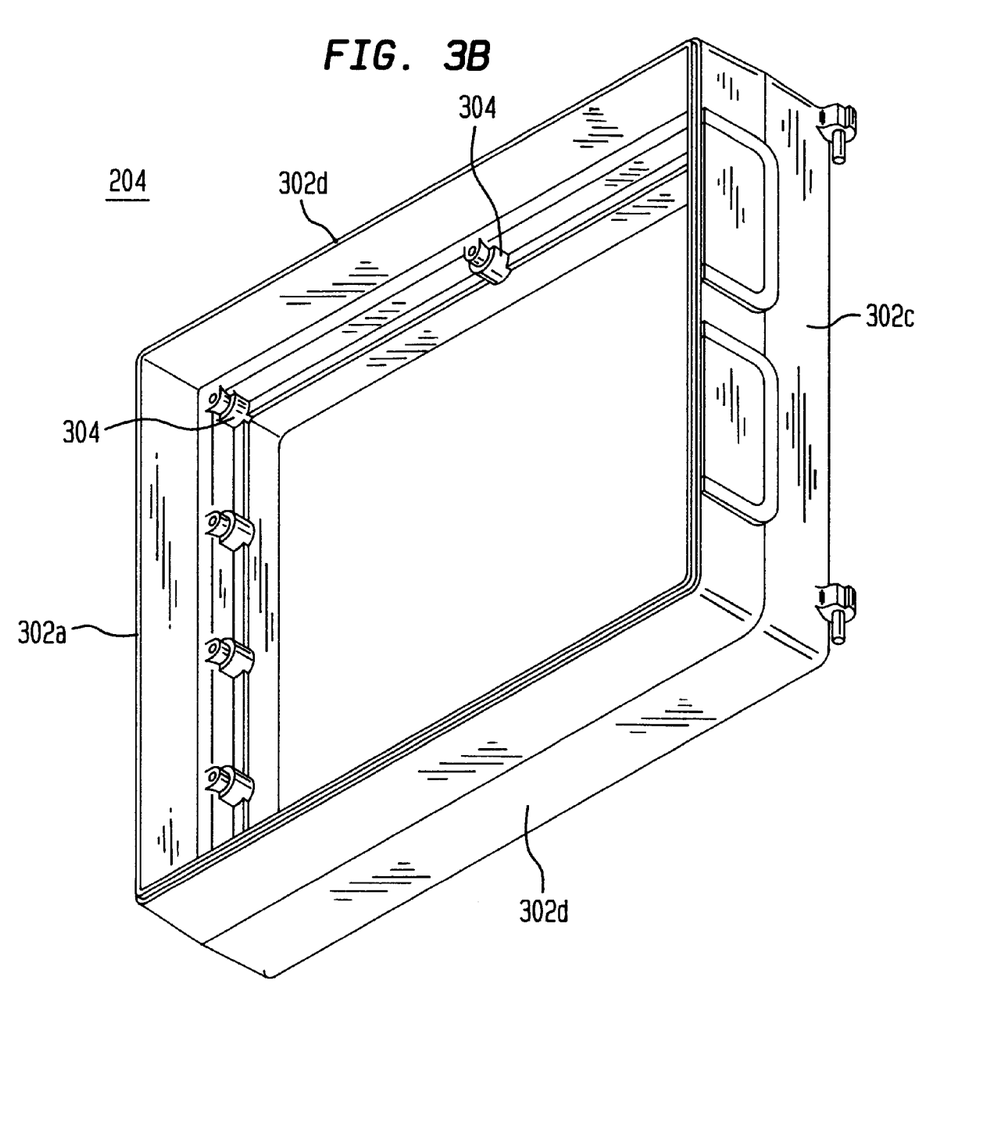

FIGS. 3A–B show perspective views of mid layer 204 of FIG. 2, according to one embodiment of the present invention. Mid layer 204 has four walls 302a–d. On the inside surface of walls 302a–d, approximately centered on the walls, mid layer 204 has hardware 304 that defines two different mounting positions—referred to as a lower mounting position and an upper mounting position—for receiving a mounting plane.

Figure 4:
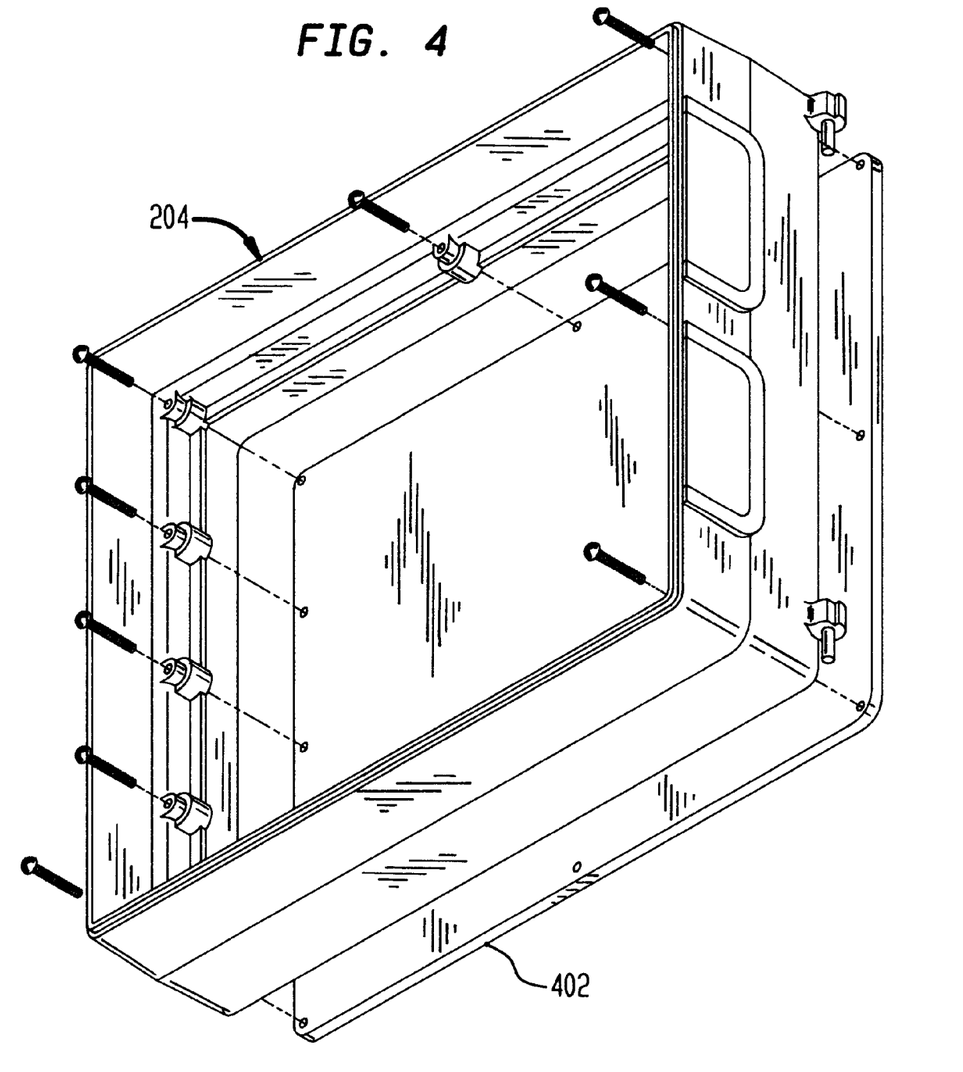
FIG. 4 shows an exploded view of the mid layer of FIG. 3 configured with a mounting plane mounted in the lower mounting position.

FIG. 4 shows an exploded view of mid layer 204 configured with a mounting plane 402 mounted in the lower mounting position.

Figure 5:
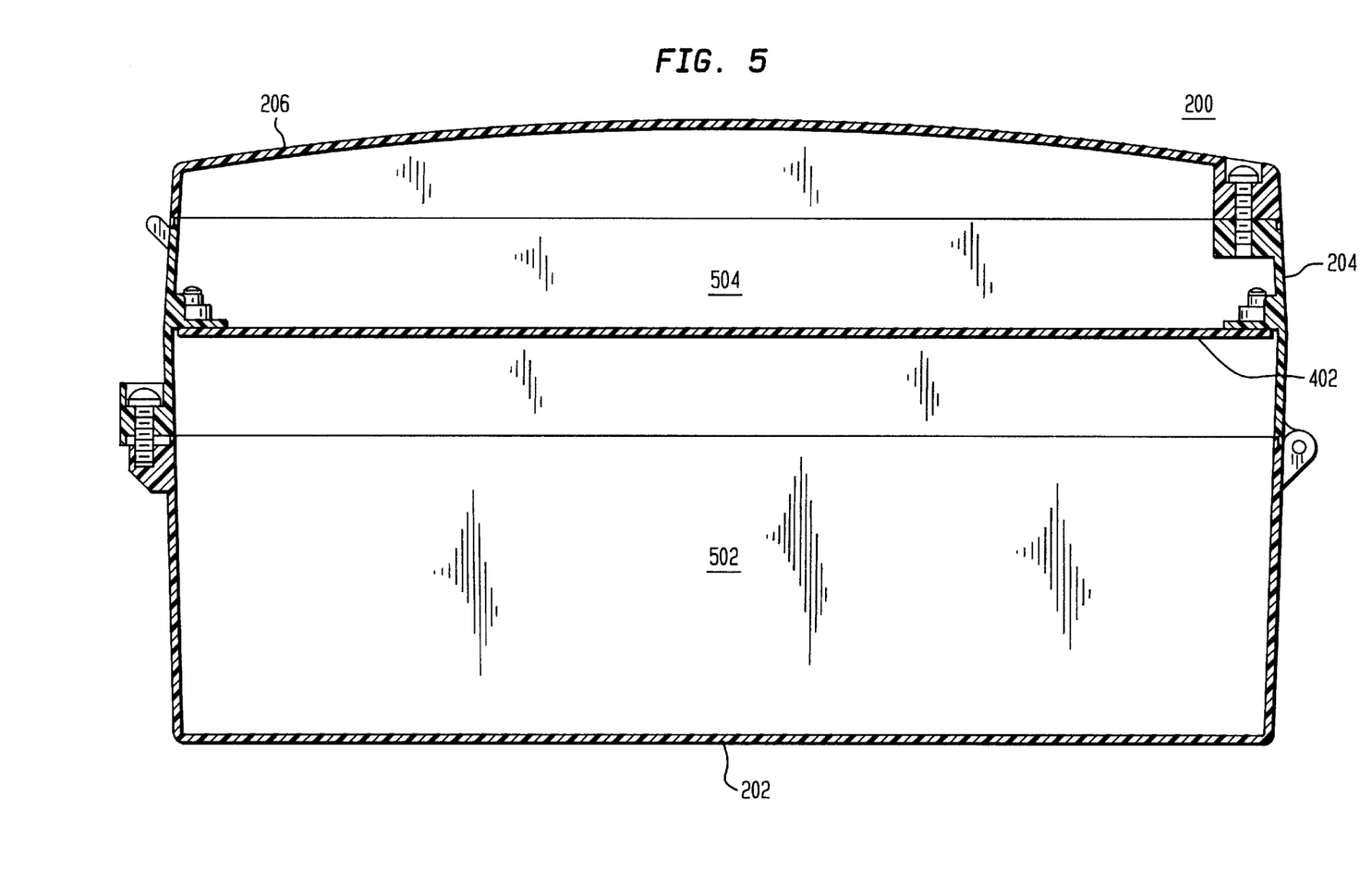
FIG. 5 shows a cross-sectional view of the BEP enclosure of FIG. 2 configured with the mounting plane mounted on the mid layer in the lower mounting position.

FIG. 5 shows a cross-sectional view of BEP enclosure 200 configured with mounting plane 402 mounted on mid layer 204 in the lower mounting position. When mid layer 204 is configured with mounting plane 402 in the lower mounting position, two chambers are defined: an inner chamber 502 and an outer chamber 504. Depending on the application, inner chamber 502 may be used to retain cable splicing and electrical isolation hardware, with some of the electrical isolation hardware mounted directly on the lower surface of mounting plane 402. Similarly, outer chamber 504 may be used to house connection hardware, with some of the connection hardware mounted directly on the upper surface of mounting plane 402.

Figure 6:
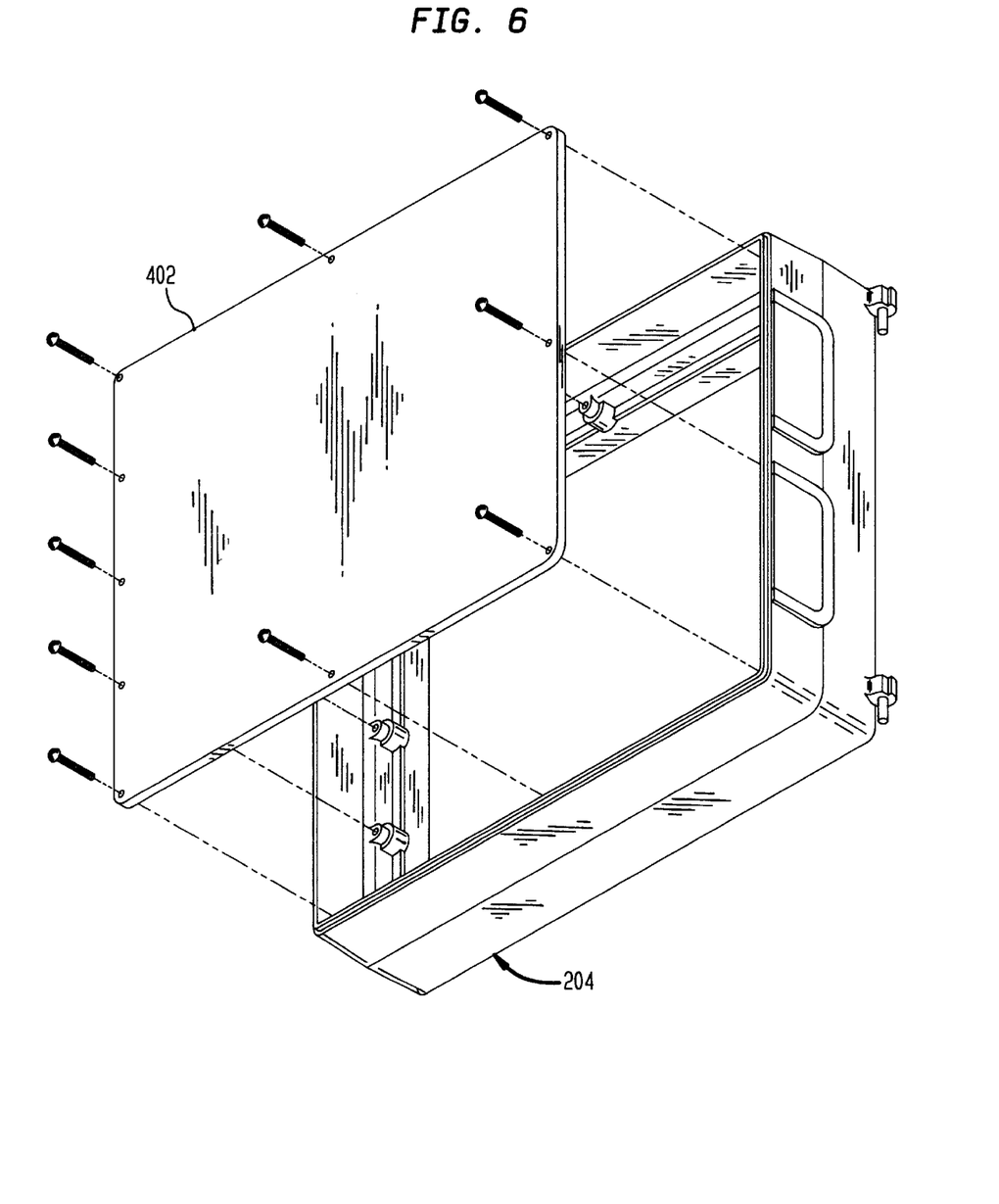
FIG. 6 shows an exploded view of the mid layer of FIG. 3 configured with a mounting plane mounted in the proper mounting position.

FIG. 6 shows an exploded view of mid layer 204 configured with the same mounting plane 402 of FIG. 4, but, in this case, mounted to mid layer 204 in the upper mounting position.

Figure 7:
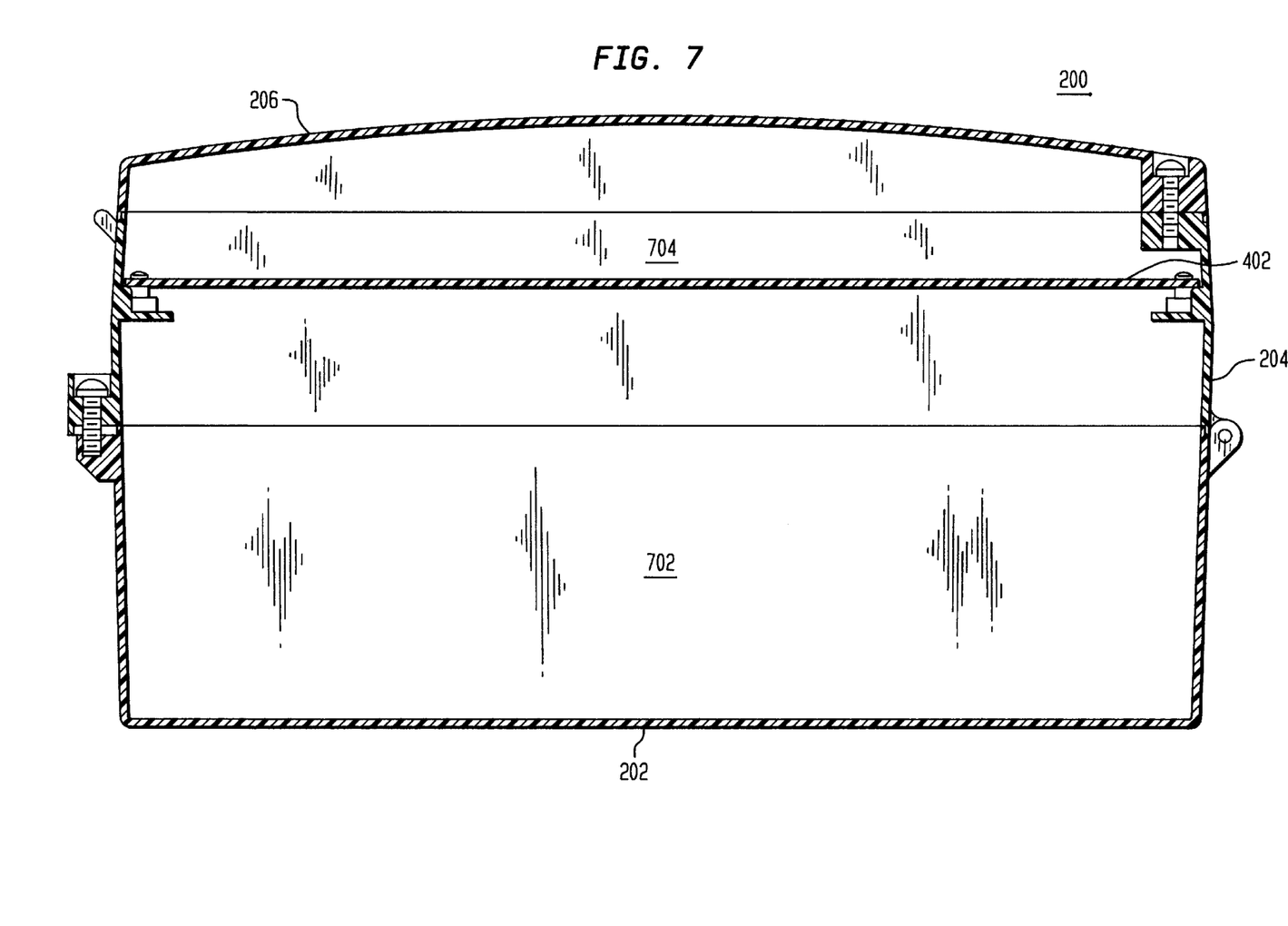
FIG. 7 shows a cross-sectional view of the BEP enclosure of FIG. 2 configured with the mounting plane mounted on the mid layer in the upper mounting position.

FIG. 7 shows a cross-sectional view of BEP enclosure 200 configured with mounting plane 402 mounted on mid layer 204 in the upper mounting position. When mid layer 204 is configured with mounting plane 402 in the upper mounting position, two chambers are defined: an inner chamber 702 and an outer chamber 704. Because of the different mounting positions between the configurations of FIGS. 5 and 7, the volume of inner chamber 702 of FIG. 7 is larger than that of inner chamber 502 of FIG. 5, while the volume of outer chamber 704 of FIG. 7 is smaller than that of outer chamber 504 of FIG. 5.

As shown in FIGS. 2–7, BEP enclosure 200 is designed such that mounting plane 402 can be configured in either of two different mounting positions that define two different pairs of chambers having two different sets of volumes. One of the advantages of the present invention is that mounting plane 402 can be moved from one mounting position to the other mounting position in the field by (1) removing the screws that hold mounting plane 402 to one mounting position of mid layer 204, (2) turning mounting plane 402 so that it will pass through mid layer 204 from one side to the other, and (3) securing mounting plane 402 to the other mounting position of mid layer 204, again using screws. In alternative embodiments, mounting plane 402 can be mounted to mid layer 204 using means other than screws, such as a snap-on arrangement that does not require additional mounting hardware.

For example, mounting plane 402 may be initially configured in the lower mounting position as shown in FIGS. 4–5. In this configuration, telecommunications hardware can be added to inner chamber 502 and outer chamber 504 of FIG. 5 as needed. If, over time, it becomes necessary to increase the volume of the inner chamber, mounting plane 402 can be reconfigured from the lower mounting position to the upper mounting position, as shown in FIGS. 6–7. It may, for example, become desirable to add additional electrical isolation hardware, such as relatively long plug-in protectors, that would not fit within inner chamber 502. In that case, mounting plane 402 can be reconfigured to the upper mounting position without removing BEP enclosure 200 from its mounting on a wall and without disturbing any of the hardware already housed within the inner and outer chambers, including any hardware mounted directly to mounting plane 402.

Figure 8:
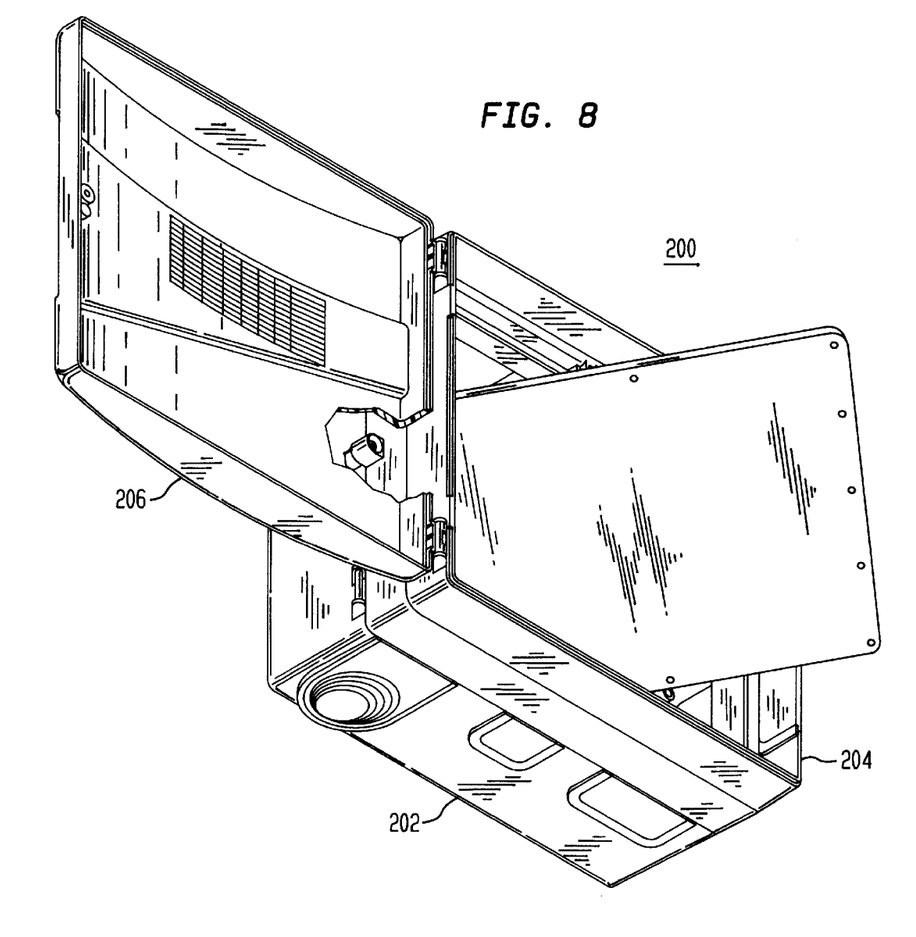
FIG. 8 shows a perspective view of the mounting plane of FIG. 4 passing through the mid layer.

FIG. 8 shows a perspective view of mounting plane 402 passing through mid layer 204 with mounting plane 402 twisted relative to mid layer 204. The fact that the diagonal dimension of mid layer 204 is greater than at least one of the lateral dimensions of mounting plane 402 allows mounting plane 402 to pass through mid layer 204 at an appropriate angle. As long as there is sufficient wiring slack in the electrical connections made to any hardware mounted directly to mounting plane 402, mounting plane 402 should be able to be reconfigured without removing any of those connections. In this way, BEP enclosure 200 can be reconfigured in the field without interrupting any of the telecommunications services provided by the hardware housed within the enclosure.

The primary components of BEP enclosure 200 of FIGS. 2–8 (i.e., base 202, mid plane 204, cover 206, and mounting plane 402) are preferably made of metal diecast (e.g., aluminum or zinc), fabricated sheet metal, or a sturdy molded plastic, such as polycarbonate, ABS, or PVC sold by GE of Pittsfield, Mass.

BEP enclosures of the present invention can be used for either conventional cables having copper twisted pairs or fiber-optic cables having optical fibers.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An enclosure for telecommunications applications, comprising an enclosure body, defined by a base, a mid layer pivotally connected to the base, and a cover pivotally connected to the mid layer, and a mounting plane adapted to be mounted onto the mid layer of the enclosure body and to separate the enclosure into a first chamber and a second chamber, wherein:

the first chamber is accessible by pivoting the mid layer with respect to the base and the second chamber is accessible by pivoting the cover with respect to the mid layer;

a first side of the mounting plane is adapted to be used to mount a first set of electrical equipment located in the first chamber and a second side of the mounting plane is adapted to be used to mount a second set of electrical equipment located in the second chamber, wherein the first set of electrical equipment is different from the second set of electrical equipment; and the mounting plane is adapted to be mounted onto the mid layer of the enclosure body at two different mounting positions to define different volumes for the first and second chambers to accommodate different sized electrical equipment in the first and second sets of electrical equipment, respectively.

2. The invention of claim 1, wherein the mounting plane is adapted to be moved from one mounting position to the other mounting position without disconnecting any electrical equipment mounted on the mounting plane.

3. The invention of claim 1, wherein:

the first side of the mounting plane is adapted to receive electrical isolation equipment located in the first chamber and the second side of the mounting plane is adapted to receive electrical connection equipment located in the second chamber; and the mounting plane is adapted to be moved from one mounting position to the other mounting position to increase the volume of the first chamber, thereby enabling mounting of larger electrical isolation equipment within the first chamber.

* * * * *